United States Patent
Bell et al.

(10) Patent No.: US 7,582,710 B2
(45) Date of Patent: Sep. 1, 2009

(54) DEGASSING PROCESS

(75) Inventors: Andrew David Bell, Carry-le-Rouet (FR); David Andrew Fargie, Kent (GB); David Edward Noble, Essex (GB); Michael Bernard Power, London (GB); Iain David Ross, Surrey (GB)

(73) Assignee: Ineos Europe Limited, Hampshire (GB)

( * ) Notice: Subject to any disclaimer, the term of this patent is extended or adjusted under 35 U.S.C. 154(b) by 0 days.

(21) Appl. No.: 10/485,222

(22) PCT Filed: Jul. 15, 2002

(86) PCT No.: PCT/GB02/03240

§ 371 (c)(1),
(2), (4) Date: Jan. 30, 2004

(87) PCT Pub. No.: WO03/011920

PCT Pub. Date: Feb. 13, 2003

(65) Prior Publication Data

US 2004/0242810 A1 Dec. 2, 2004

(30) Foreign Application Priority Data

Jul. 31, 2001 (GB) .................................. 0118609.7

(51) Int. Cl.
*C08F 2/00* (2006.01)
*C08F 210/00* (2006.01)

(52) U.S. Cl. ............................ 526/68; 526/70; 526/348; 526/348.5; 526/352; 526/901

(58) Field of Classification Search .................... 526/68, 526/70, 348, 348.5, 352, 901
See application file for complete search history.

(56) References Cited

U.S. PATENT DOCUMENTS 4,372,758 A * 2/1983 Bobst et al. .................. 528/483

(Continued)

FOREIGN PATENT DOCUMENTS

EP 0 596 434 A1 5/1994

(Continued)

*Primary Examiner*—William K Cheung
(74) *Attorney, Agent, or Firm*—Nixon & Vanderhye

(57) ABSTRACT

An improved process for the polymerization of olefin monomer selected from (a) ethylene, (b) propylene, (c) mixtures of ethylene and propylene and (d) mixtures of (a), (b) or (c) with one or more alpha-olefins in a fluidized bed gas phase reactor, said process comprising passing a gaseous mixture of said olefin monomers(s) through the fluidized bed under effective polymerization conditions to provide a polymer product containing unreacted monomer(s) and a gaseous effluent stream comprising unreacted monomer(s), removing the polymer product to a degassing vessel, recycling a first portion of the gaseous effluent stream to the fluidized bed and passing a second portion of the gaseous effluent stream to counter currently contact the polymer product in said degassing vessel to produce a polymer product having a reduced amount of unreacted monomer(s), characterized in that the improvements to the process comprise: (i) removing heavy hydrocarbons from the second portion of the effluent stream and returning said hydrocarbons to the first portion of the effluent stream for recycle to the fluidized bed, (ii) removing substantially all of the monomer(s) from the second portion of the effluent stream and returning said monomers(s) to the first portion of the effluent stream for recycle to the fluidized bed, and (iii) recycling the second effluent stream after passage through the degassing vessel to the gaseous effluent stream.

10 Claims, 2 Drawing Sheets

U.S. PATENT DOCUMENTS 5,376,742 A * 12/1994 Krause .................. 526/68
5,741,350 A    4/1998 Rowles et al.

FOREIGN PATENT DOCUMENTS

| | | | |
|---|---|---|---|
| EP | 0 801 081 A2 | 10/1997 |
| EP | 0 830 892 A1 | 3/1998 |
| WO | WO 94/28032 | 12/1994 |

* cited by examiner

DEGASSING PROCESS

BACKGROUND OF THE INVENTION

The present invention relates to an improved process for the recovery of polymer product from polymerisation processes and in particular to the recovery of polymer product from gas phase fluidised bed processes for the polymerisation of olefins. The present invention is most suitable for the recovery of polymer product from gas phase fluidised bed processes for the polymerisation and copolymerisation of ethylene and alpha-olefins.

Homopolymers of ethylene and copolymers of ethylene and α-olefins have been prepared commercially for many years in both batch and continuous processes in solution, slurry and gas phase reactors.

One particularly important gas phase process employs a fluidised bed reactor for the catalytic polymerisation of gaseous monomers and comonomers to produce solid particulate polymers and copolymers. Fluidised bed reactors may be operated by the continuous feed of catalyst and a gaseous stream containing the polymerisable monomers and comonomers to a fluidised bed composed of particulate polymeric material. The polymeric bed is kept fluidised by a rising stream of the gaseous feed mixture containing the monomers and comonomers. Unreacted monomers and comonomers and carrier gases which may be employed are carried out of the reactor and recycled and returned to the bottom of the reactor where additional feed gases are introduced. This combined mixture of gases is passed through the fluidised bed to maintain it in a fluidised state and to maintain the polymerisation reaction. The exothermic heat of the polymerisation reaction is removed by passage of the recycled gaseous stream through heat exchange equipment prior to its return to the bottom of the reactor. The polymer product from the reactor may be conveniently removed by conventional means.

The polymer product removed from the reactor may contain unreacted monomers, comonomers and other associated hydrocarbon species (hydrogen, ethane, methane, propane, pentane, hexane, butane) and these monomers, comonomers and the other hydrocarbons should be removed from the polymer product since failure to do so may lead to (a) hydrocarbons levels rising to explosive levels in downstream equipment or (b) environmental constraints being exceeded.

There are a number of prior art patents which describe methods for the removal of such monomers. For example U.S. Pat. No. 4,372,758 describes a degassing process which uses an inert gas such as nitrogen for the removal of unreacted gaseous monomer from the polymer product. Solid polymer is conveyed to the top of a purge vessel by means of an inert gas system, an inert gas stream is introduced into the bottom of the purge vessel and the solid polymer is counter currently contacted with the inert gas stream to remove the unreacted gaseous monomers from the solid polymer product.

The unreacted monomers may then be mixed with an inert gas stream which is often passed to a flare for disposal or vented to the atmosphere.

EP 127253 describes a process for the removal of residual monomers from ethylene copolymers by subjecting the copolymer to a reduced pressure zone sufficient to desorb the monomer, sweeping the copolymer with reactor gas which is free of inert gases and recycling the resultant gas containing the desorbed monomer to the polymerisation zone.

EP 683176 describes a process whereby the gas mixture comprising polymer product and unreacted monomers is passed from the reactor to a depressurization zone, separating the mixture into a solid phase and a gaseous phase, the solid phase then being subjected to a non-deactivating flushing with an inert gas and then a deactivating flushing with a gaseous mixture of nitrogen, water and oxygen. The gaseous phase is sent directly or indirectly back to the reactor.

EP 596434 describes a process for removing unpolymerised gaseous monomers from a solid olefin polymer containing gaseous monomers by counter currently passing a purge gas through said polymer in a purge vessel having upper and lower portions and a gas permeable, solids impermeable membrane between said portions.

U.S. Pat. No. 5,376,742 describes a process for minimizing the venting or flaring of the unreacted monomers whereby effluent gases are used to purge unreacted monomer from the polymer product. The process described therein also provides a process for the recycling of unreacted monomers to the reactor vessel as well as providing a process which minimizes or reduces the quantity of inert gases used for both the transport of polymer product and the purging or degassing of the unreacted monomer from the polymer product. In the process described in U.S. Pat. No. 5,376,742 a small portion (1-5%) of the recycle stream exiting the reactor is cooled and separated into a gas and a liquid stream. The gaseous stream comprising the majority of the ethylene as well as hydrogen and nitrogen is used for purging unreacted monomers from the polymer product in a degassing vessel. This gaseous stream is passed counter currently with the polymer product and unreacted monomers. A portion of the ethylene may be removed from the gaseous stream, prior to its use for the purging of the polymer product, and passed to an ethylene recovery unit. The gaseous stream together with the unreacted monomer purged from the polymer product is passed either to a flare for disposal or more usually through a recycle compressor and back to the polymerisation reactor.

A concern with the use of a gaseous stream comprising a major proportion of ethylene as the purge gas for degassing the polymer product is the potential for further reaction of the still active polymer powder present in the degassing vessel which may lead to blockages and a change in powder physical properties if allowed to occur. This is also a potential problem during the copolymerisation of ethylene and alpha-olefins, in particular hex-1-ene, the presence of which may lead to agglomerates in the degassing vessel.

SUMMARY OF THE INVENTION

We have now discovered that this concern may be reduced by removal of substantially all of the monomer, for example ethylene, from the gaseous stream prior to its use in the degassing vessel and advantageously the removed monomer may then be returned to the main recycle loop.

The main aspect of the present invention will now be described by reference to a gas phase fluidised bed process for the polymerisation of olefin monomers and comonomers.

Thus according to the present invention there is provided a process for the polymerisation of olefin monomer selected from (a) ethylene, (b) propylene, (c) mixtures of ethylene and propylene and (d) mixtures of (a), (b) or (c) with one or more alpha-olefins in a fluidised bed gas phase reactor, said process comprising passing a gaseous mixture of said olefin monomer(s) through the fluidised bed under effective polymerisation conditions to provide a polymer product containing unreacted monomer(s) and a gaseous effluent stream comprising unreacted monomer(s), removing the polymer product to a degassing vessel, recycling a first portion of the gaseous effluent stream to the fluidised bed and passing a second portion of the gaseous effluent stream to counter currently contact the polymer product in said degassing vessel to produce a polymer product having a reduced amount of unreacted monomer(s), characterised in that the improvements to the process comprise
(i) removing heavy hydrocarbons from the second portion of the effluent stream and returning said hydrocarbons to the first portion of the effluent stream for recycle to the fluidised bed,
(ii) removing substantially all of the monomer(s) from the second portion of the effluent stream and returning said monomer(s) to the first portion of the effluent stream for recycle to the fluidised bed, and
(iii) recycling the second effluent stream after passage through the degassing vessel to the gaseous effluent stream.

DETAILED DESCRIPTION OF THE INVENTION

Figure 1:
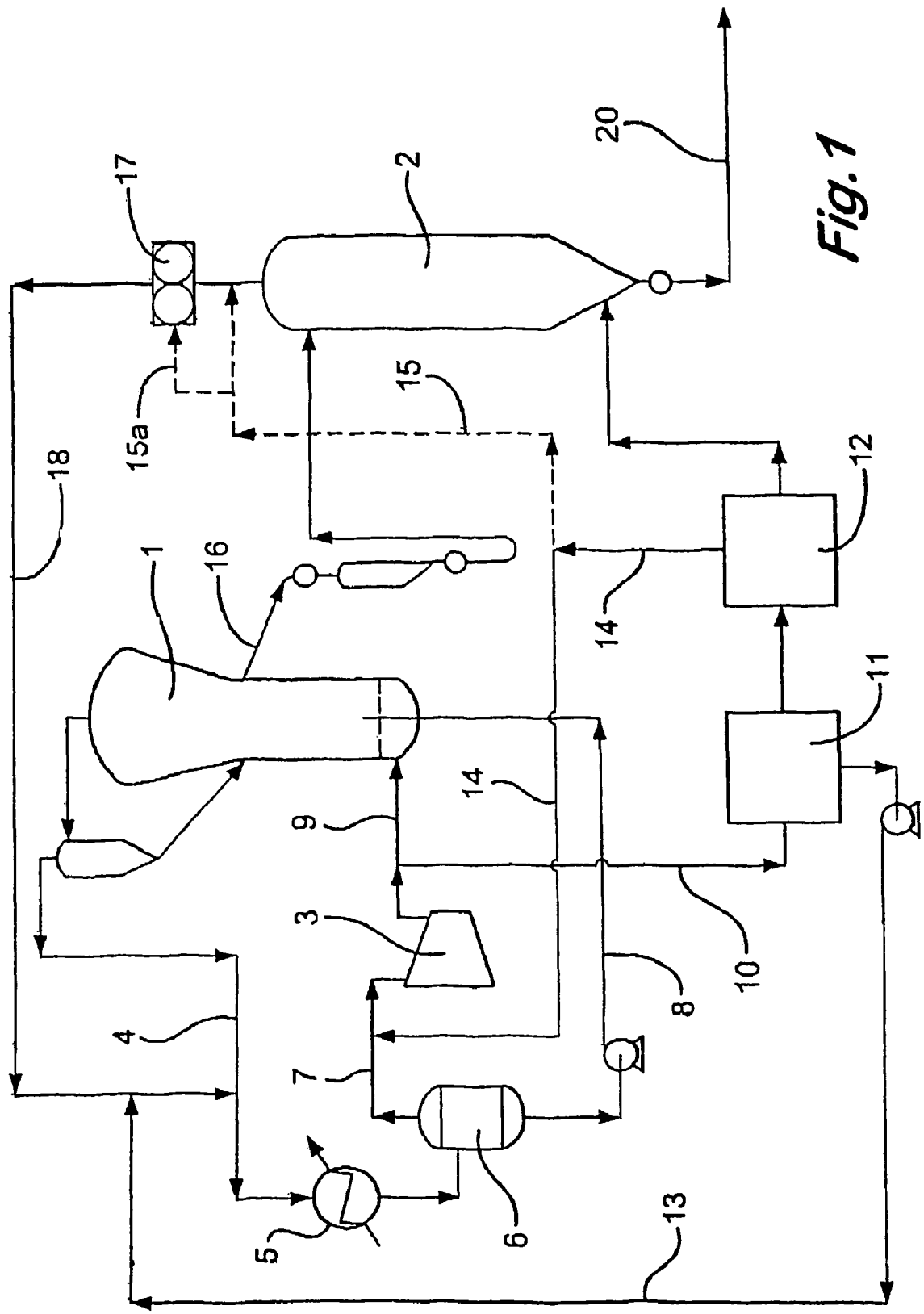
FIG. 1 is a flow diagram of a gas phase fluidized bed process for the copolymerization of ethylene and alpha-olefins.

In a preferred fluidised bed polymerisation process the gaseous effluent stream from the reactor is cooled by passage through a heat exchanger and then returned to the fluidised bed to both maintain the fluidisation of the bed and to remove heat from the bed.

The second portion of the gaseous effluent stream is typically between 5-10% of the total gaseous effluent stream leaving the reactor and preferably between 7-10%.

The heavy hydrocarbons present in the gaseous effluent stream may typically comprise those having 5 to 8 carbon atoms and are typically used in the manufacture of linear low density polyethylene. These may be removed from the gaseous effluent stream using for example a membrane, pressure swing adsorption (PSA), refrigeration or other suitable separation processes.

If the removal of the heavy hydrocarbons is by refrigeration they may be returned as a liquid to the first gaseous effluent stream by means of a pump. The liquid stream may be returned to the first gaseous effluent stream preferably upstream of the heat exchanger.

In another embodiment of the present invention the heavy hydrocarbons may be removed from the gaseous effluent stream by means of a suitable membrane. In this embodiment the removed heavy hydrocarbons may be returned as a gaseous stream to the first gaseous effluent stream upstream of the main recycle compressor. Alternatively the removed heavy hydrocarbons may be passed as a gaseous stream to the second gaseous effluent stream leaving the degassing vessel.

In another embodiment of the present invention the heavy hydrocarbon removal unit may comprise both a refrigeration and membrane separation process wherein a portion of the heavy hydrocarbons may be removed as a liquid and a portion as a gas.

The present invention is particularly suitable for the (co) polymerisation of ethylene. The following description will therefore reference such a preferred process in which the predominant monomer is ethylene.

The ethylene may be removed from the gaseous effluent stream by similar separation techniques to those utilised for the heavy hydrocarbons for example by use of a membrane, PSA or similar. The ethylene is removed as a gaseous stream which is preferably passed to the first gaseous effluent stream upstream of the main recycle compressor. Alternatively the removed ethylene may be passed to the second effluent stream after its passage through the degassing vessel.

Both the recovered heavy hydrocarbons, when in gaseous form, and the recovered ethylene may be passed directly to the line compressor located downstream of the degassing vessel.

It is envisaged that after passage through the heavy hydrocarbon recovery unit, essentially all of the heavy hydrocarbons will be removed from the gaseous stream before passage to the ethylene recovery unit.

The second gaseous effluent stream, after removal of the heavy hydrocarbons and ethylene, is passed to the degassing vessel for counter current contact with the copolymer product containing unreacted monomer(s). The polymer product is passed to the degassing vessel by suitable withdrawal means, for example by means of a gravity powder withdrawal system. Suitable polymer withdrawal systems for use with the present invention are those described in EP 188125, EP 728771, EP 728772 and EP 830892.

The gaseous effluent stream is suitably passed to the lower region of the degassing vessel and the polymer product is passed to the upper region of the vessel.

After passage through the degassing vessel the gaseous stream may be returned to the first gaseous effluent stream by means of a compressor. Before passage to the first gaseous stream the stream leaving the degassing vessel may be combined with the liquid heavy hydrocarbon stream after its separation from the second portion of the gaseous effluent stream.

By removing substantially all of the ethylene from the second gaseous effluent stream before its passage to the degassing vessel, the potential for further reaction of the still active polymer powder present in the degassing vessel and resultant blockages may be substantially reduced.

The amount of ethylene remaining in the gaseous stream prior to passage to the degassing vessel is preferably <10% and most preferably <5%. If necessary it is envisaged that further ethylene recovery units may used prior to the degassing vessel in order to further reduce the amount of ethylene.

Another advantage of the present invention is that there may be no requirement for the polymer powder after passage through the degassing vessel to undergo any further degassing procedures thereby substantially reducing costs.

By recovering essentially all of the heavy hydrocarbons the nitrogen purge for the system may suitably be located between the ethylene recovery unit and the degassing vessel. In this situation the purge is advantageously rich in nitrogen and lean in ethylene and hence overall hydrocarbon losses from the system may be substantially reduced.

The gaseous effluent stream comprising unreacted ethylene and unreacted alpha-olefin monomer if present is preferably split into the first and second gaseous effluent streams downstream of the main recycle compressor. In this way the main recycle compressor provides the driving force for the circulation of the second gaseous effluent stream as the stripping gas in the degassing vessel. Hence a dedicated compressor is not required in order to circulate the second gaseous effluent stream to the degassing vessel.

A particularly suitable fluidised bed polymerisation process for use with the present invention is that described in WO 94/28032 incorporated herein by reference. In the process described therein the gaseous effluent stream comprising unreacted ethylene and unreacted alpha-olefin monomer is cooled to condense out at least some liquid hydrocarbon. The condensed liquid hydrocarbon, which may be a monomer or an inert liquid, is separated from the gaseous effluent stream and is fed directly to the fluidised bed in order to cool the bed by the latent heat of evaporation. The gaseous effluent stream after separation is returned separately to the fluidised bed in order to maintain the bed in a fluidised state. Such a process requires therefore the presence of both a heat exchanger and a separator in the system in order to both cool and separate the gaseous effluent stream.

The fluidised bed process is operated at temperatures in the range 30 to 130° C. typically in the range 80 to 105° C. and at pressures in the range 0.5 to 6 Mpa.

The present invention when applied to the process described in WO 94/28032 preferably comprises a process wherein the removed ethylene from the gaseous effluent stream is preferably passed to the first gaseous effluent stream downstream of the separator and upstream of the main recycle compressor. The removed ethylene is thus passed to the gaseous stream leaving the separator.

The present invention may be suitable for use with any gas phase process, whether fluidised or unfluidised, which requires the use of a degassing system in order to remove unreacted monomer from the polymer product.

The present invention may be adaptable for any polymerisation process wherein a polymer product undergoes a degassing process for the removal of unreacted monomer(s).

The process according to the present invention may be used to prepare a variety of polymer products. It is particularly applicable for the preparation of linear low density polyethylene (LLDPE) based on copolymers of ethylene and alpha-olefins for example butene, 4-methyl-1-pentene or hex-1-ene as well as high density polyethylene (HDPE) which can for example be copolymers of ethylene with small portion of higher alpha-olefins for example butene, pent-1-ene, hex-1-ene or 4-methyl-1-pentene.

The process according to the present invention may be applicable to polymerisation processes catalysed by well known polymerisation catalyst systems for example Ziegler-Natta, chromium, metallocene or late transition metal catalysts.

The polymer product may be withdrawn from the reactor by any suitable means. However a particularly suitable method is described in EP 830892 the relevant portions of which are incorporated herein by reference.

Figure 2:
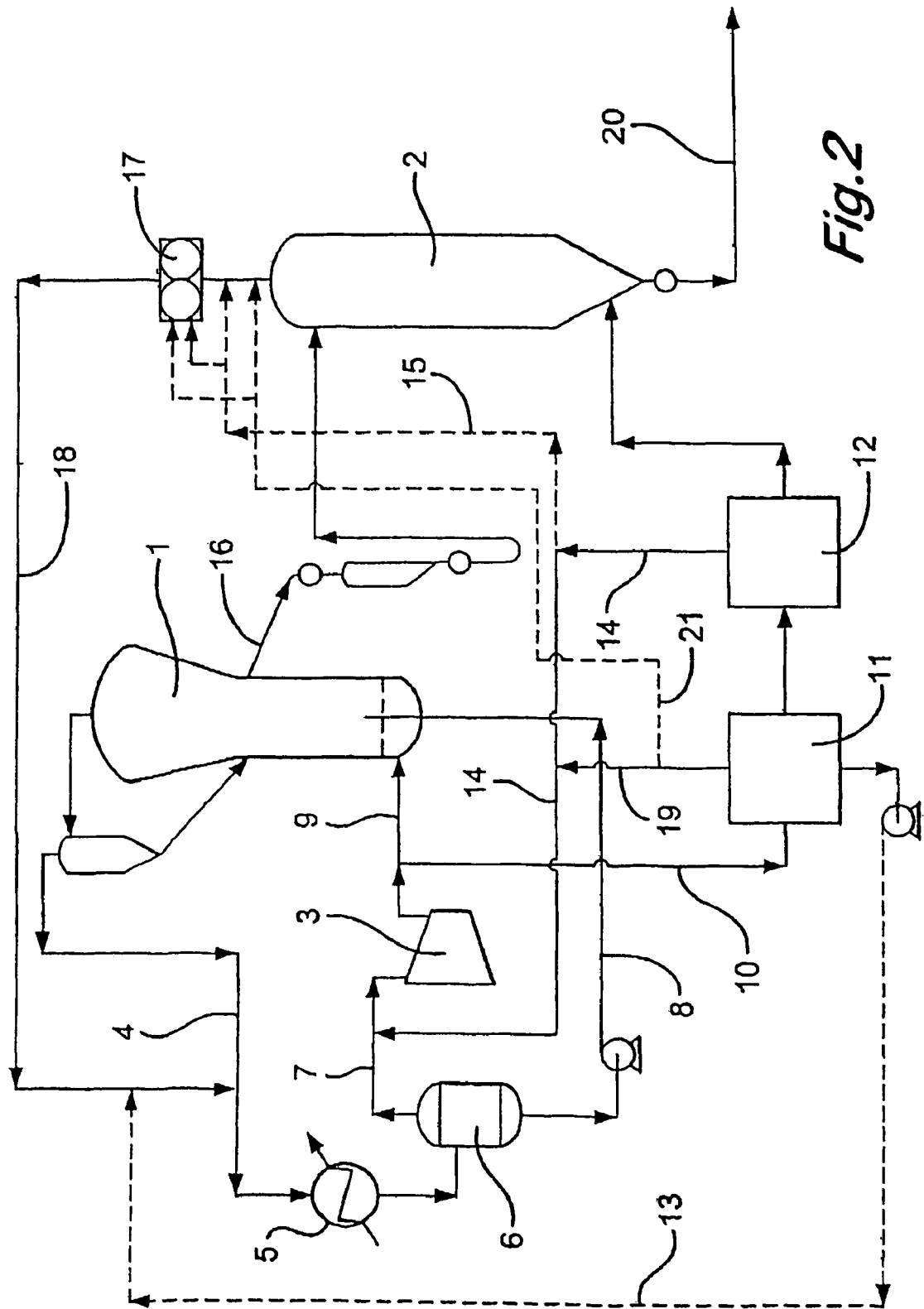
FIG. 2 is a flow diagram of a modified version of the gas phase fluidized bed process of FIG. 1.

In order to more fully describe the present invention, FIGS. 1 and 2 represent flow diagrams illustrating the main features of the invention as applied to a gas phase fluidised bed process for the copolymerisation of ethylene and alpha-olefins. FIG. 1 shows a fluidised bed reactor (1), a degassing vessel (2) and a main recycle compressor (3). A gaseous effluent stream (4) comprising unreacted ethylene and unreacted alpha-olefin monomer passes from the top of reactor (1) to a heat exchanger (5) and then to a separator (6) to provide a gaseous stream (7) and a liquid stream (8). The gaseous stream (7) is passed to the compressor (3) before being returned to the bottom of the reactor (1) in order to maintain the bed in a fluidised state. The liquid stream (8) is passed separately to the reactor. The aforementioned process is typical of that described in WO 94/28032.

For the operation of the process according to the present invention the gaseous stream (7) is split into a first stream (9) and a second stream (10) downstream of the compressor (3). The first gaseous stream (9) is returned to the bottom of the reactor in order to maintain the bed in a fluidised state.

The second stream (10) passes to a heavy hydrocarbon recovery unit (11) and then to an ethylene recovery unit (12). The heavy hydrocarbon recovery unit (11) comprises a refrigeration/cooling unit and the recovered heavy hydrocarbons are returned as a liquid to the gaseous stream via line (13). Recovered ethylene, which may contain light hydrocarbons (such as ethane, butane) not removed at step (11), is passed via line (14) to the gaseous stream (7) at a point upstream of the compressor (3). Alternatively the ethylene may be passed via line (15) to a location downstream of the degassing vessel (2). The ethylene may alternatively be passed directly via line (15a) to the compressor.

The gaseous stream is passed after the ethylene recovery unit to the lower portion of the degassing vessel (2).

The ethylene/alpha-olefin copolymer product containing unreacted monomer(s) is removed from the reactor (1) via line (16) and subsequently to the upper region of the degassing vessel (2) before counter current contact with the gaseous stream.

The gaseous stream leaving the degassing vessel (2) is then returned via line compressor (17) and line (18) to the gaseous effluent stream (4) comprising unreacted ethylene and unreacted alpha-olefin monomer leaving the reactor (1).

Polymer product containing a reduced amount of unreacted monomer(s) is removed from the degassing vessel (2) by line (20).

FIG. 2 represents another embodiment of the present invention in which the heavy hydrocarbon recovery unit (11) comprises a membrane separator. The recovered heavy hydrocarbons are passed via lines (19) and (14) to the gaseous stream (7) at a point upstream of the compressor (3). Alternatively the recovered heavy hydrocarbons may be passed via line (21) to a location downstream of the degassing vessel. In the case where the heavy hydrocarbon recovery unit comprises both refrigeration and membrane separation, the recovered liquid stream may again be passed by line (13).

The invention claimed is:

1. A process for the polymerization of olefin monomer(s) selected from the group consisting of (a) ethylene, (b) propylene, (c) mixtures of ethylene and propylene and (d) mixtures of (a), (b) or (c) with one or more alpha-olefins in a fluidized bed gas phase reactor, said process comprising passing a gaseous mixture of said olefin monomer(s) through the fluidized bed under effective polymerization conditions to provide a polymer product containing unreacted monomer(s) and a gaseous effluent stream containing unreacted monomer(s), removing the polymer product to a degassing vessel, splitting the gaseous effluent stream into first and second portions, recycling the first portion of the gaseous effluent stream to the fluidized bed, removing heavy hydrocarbons from the second portion of the effluent stream and returning said heavy hydrocarbons to the gaseous effluent stream for recycle to the fluidized bed, removing unreacted monomer(s) from the second portion of the effluent stream so that the amount of unreacted monomer(s) in the second portion of the effluent stream is <10% and returning said unreacted monomer(s) to the gaseous effluent stream for recycle to the fluidized bed, thereafter passing the second portion of the gaseous effluent stream to counter currently contact the polymer product in said degassing vessel to produce a polymer product having a reduced amount of unreacted monomer(s) and recycling the second portion of the effluent stream after passage through the degassing vessel to the gaseous effluent stream.

2. The process according to claim 1 wherein the heavy hydrocarbons are removed from the second portion of the effluent stream by a membrane.

3. The process according to claim 1 wherein the unreacted monomer(s) are removed from the second portion of the effluent stream by a membrane.

4. The process according to claim 1 wherein the gaseous effluent stream is split into the first and the second portions downstream of a recycle compressor.

5. The process according to claim 1 wherein the unreacted monomer(s) removed from the second portion of the gaseous effluent stream are returned to the gaseous effluent stream upstream of a recycle compressor.

6. The process according to claim 1 wherein the predominant unreacted monomer in the gaseous effluent stream is ethylene.

7. The process according to claim 1 comprising the copolymerization of ethylene and one or more alpha-olefins.

8. The process according to claim 7 wherein the alpha-olefin is hex-1-ene.

9. The process according to claim 1 wherein the second portion of the gaseous effluent stream is between 5-10% of the total gaseous effluent stream leaving the reactor.

10. The process according to claim 1 wherein the amount of unreacted monomer(s) in the second portion of the effluent stream is <5%.

* * * * *